United States Patent
Butler et al.

(10) Patent No.: US 11,004,057 B2
(45) Date of Patent: *May 11, 2021

(54) SYSTEMS FOR PROVIDING AND PROCESSING CUSTOMIZED LOCATION-ACTIVATED GIFTS

(71) Applicant: Capital One Services, LLC, McLean, VA (US)

(72) Inventors: Taurean Butler, Brooklyn, NY (US); Christine Berglund, Brooklyn, NY (US); Adam Vukich, Alexandria, VA (US); Jessica Greenberg, New York, NY (US); Colin Hart, Arlington, VA (US); Mykhaylo Bulgakov, Arlington, VA (US); Jason Ji, Reston, VA (US); Kaylyn Gibilterra, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/014,454

(22) Filed: Jun. 21, 2018

(65) Prior Publication Data

US 2019/0392418 A1    Dec. 26, 2019

(51) Int. Cl.
*G06Q 20/32* (2012.01)
*H04W 4/02* (2018.01)
(Continued)

(52) U.S. Cl.
CPC ......... *G06Q 20/3224* (2013.01); *G06Q 20/36* (2013.01); *G06Q 20/385* (2013.01); *H04W 4/021* (2013.01)

(58) Field of Classification Search
CPC ...... G06Q 20/342; G06Q 30/06; G06Q 20/12; G06Q 20/40; G06Q 40/02; G06Q 20/32;
(Continued)

(56) References Cited

U.S. PATENT DOCUMENTS

| | | | |
|---|---|---|---|
| 8,577,356 B2 | 11/2013 | Komilovsky et al. | |
| 8,755,824 B1 * | 6/2014 | Wang | H04W 4/021 |
| | | | 455/456.3 |

(Continued)

FOREIGN PATENT DOCUMENTS

| | | |
|---|---|---|
| EP | 2829036 A1 | 1/2015 |
| WO | 2014120051 A1 | 8/2014 |

*Primary Examiner* — Hao Fu
(74) *Attorney, Agent, or Firm* — Troutman Pepper Hamilton Sanders LLP; Christopher J. Forstner; John A. Morrissett

(57) ABSTRACT

A method for providing a gift includes receiving gift information from a first computing device. The gift information includes a maximum gift amount, a gift recipient, and a gifter financial account and gift redemption information. The method includes generating a tokenized PAN associated with the gifter financial account, identifying a second computing device associated with the gift recipient, determining one or more gift redemption locations and receiving gift recipient location data. The method includes determining that the second computing device has entered a gift-eligible location based on the gift recipient location data and the one or more redemption locations and transmitting data indicative of a gift for display by the second computing device. The method further includes outputting an instruction to debit the gifter financial account with an amount of money in response to determining that a transaction has been executed using the tokenized PAN at the gift-eligible location.

20 Claims, 8 Drawing Sheets

(51) Int. Cl.
*H04W 4/021* (2018.01)
*G06Q 20/36* (2012.01)
*G06Q 20/38* (2012.01)

(58) Field of Classification Search
CPC .......... G06Q 20/3224; G06K 9/00671; G06K 9/00624; G06K 9/00771; G06L 9/46; H04L 63/0428; H04W 4/02
See application file for complete search history.

(56) References Cited

U.S. PATENT DOCUMENTS

| | | | |
|---|---|---|---|
| 8,850,603 | B2 | 9/2014 | Methenitis |
| 8,904,479 | B1 | 12/2014 | Johansson et al. |
| 9,015,066 | B2 | 4/2015 | Scipioni et al. |
| 9,069,794 | B1* | 6/2015 | Bandukwala ............ G06K 9/46 |
| 9,460,433 | B2 | 10/2016 | Proctor, Jr. et al. |
| 9,483,786 | B2 | 11/2016 | Glass et al. |
| 9,628,950 | B1 | 4/2017 | Noeth et al. |
| 10,380,596 | B1* | 8/2019 | Butler ................. G06Q 20/405 |
| 10,410,207 | B1* | 9/2019 | Butler ................. G06Q 20/342 |
| 2005/0197919 | A1 | 9/2005 | Robertson |
| 2007/0015490 | A1 | 1/2007 | Munje et al. |
| 2008/0024272 | A1 | 1/2008 | Fiske |
| 2011/0251962 | A1 | 10/2011 | Hruska |
| 2012/0197794 | A1* | 8/2012 | Grigg ................... G06Q 20/105 705/41 |
| 2013/0144732 | A1 | 6/2013 | Rothschild |
| 2013/0166445 | A1* | 6/2013 | Isaacson ............ G06Q 30/0234 705/41 |
| 2013/0254036 | A1 | 9/2013 | Trinh et al. |
| 2014/0081761 | A1 | 3/2014 | Singonahalli et al. |
| 2014/0164159 | A1* | 6/2014 | Lovelace ............ G06Q 30/0601 705/26.1 |
| 2014/0180817 | A1* | 6/2014 | Zilkha ................... G06Q 30/02 705/14.55 |
| 2014/0214661 | A1 | 7/2014 | Yankovich et al. |
| 2015/0269624 | A1* | 9/2015 | Cheng ............... G06Q 30/0267 705/14.58 |
| 2016/0042434 | A1 | 2/2016 | Levitt et al. |
| 2017/0091753 | A1* | 3/2017 | May ................... G06Q 20/3278 |
| 2017/0161781 | A1 | 6/2017 | Parekh |
| 2018/0165675 | A1* | 6/2018 | Isaacson ................ G06Q 20/24 |
| 2018/0247165 | A1* | 8/2018 | Kim ..................... G06K 9/6292 |

* cited by examiner

SYSTEMS FOR PROVIDING AND PROCESSING CUSTOMIZED LOCATION-ACTIVATED GIFTS

FIELD OF INVENTION

The present disclosure relates to systems and methods for providing a gift, and more particularly systems and methods for providing a location-activated gift having customized conditions that are enforced by the system prior to allowing redemption of the gift.

BACKGROUND

Gift cards are a convenient means for people to provide a financial gift to one another that can be more personalized or allotted for a particular use than exchanging cash. To obtain a gift card, a purchaser typically pays an amount matching the desired value of the gift card (plus any gift card fees), receives the physical gift card, and provides it to the recipient for future use with one or more associated merchants that accept the card or for general use (similar to a credit card) depending on the type of gift card. While convenient, conventional gift cards often come with significant drawbacks. For example, conventional gift cards require that the purchaser spend the money to obtain the card before the money can be used by the recipient. Additionally, if the recipient only spends a portion of the value of the gift card or loses possession of the gift card, the recipient will not receive the full value that the gifter paid for the gift card, unnecessarily wasting some of the gifter's money. Furthermore, because conventional gift cards are either tied to specific merchants or available for general use (similar to a credit card), a gifter who wishes to give a customized gift for redemption from a particular merchant may find it unduly burdensome to hunt down a conventional gift card associated with that merchant, or may find that gift cards for the desired merchant do not exist. Further, before being redeemed, a conventional gift card must be transferred to the possession of the recipient so that the recipient may decide when and where to redeem the gift card, which prevents a gifter from including an element of surprise in association with a particular purchase. Accordingly, due to these limitations of conventional gift-giving, both the gifter and the gift recipient may lose out on the excitement that may be derived if, for example, the gift recipient received a gift upon arriving at a location at which the gift may be imminently used.

Accordingly, there is a need for improved systems that may allow a gifter to provide a location-activated, customized gift that may be used at any designated merchant that may be discerned via purchase authentication request data, and that does not require the gifter to spend money on the gift before the recipient redeems the gift. Embodiments of the present disclosure are directed to this and other considerations.

SUMMARY

Disclosed embodiments provide systems and methods for providing a gift. In some embodiments the gift may be a financial gift that may be provided electronically.

Consistent with the disclosed embodiments, a method of providing a gift may include receiving, from a first computing device associated with a gifter, gift information comprising data indicative of a maximum gift amount, a gift recipient, a gifter financial account that is associated with the gifter and gift redemption information. The method may include generating a tokenized primary account number (PAN) associated with the gifter financial account. The method may include identifying a second computing device, the second computing device being associated with the gift recipient based on the gift recipient. The method may include determining one or more gift redemption locations based on the gift redemption information. The method may further include receiving gift recipient location data. The method may include determining that the second computing device has entered a gift-eligible location based on the gift recipient location data and the one or more gift redemption locations. The method may include transmitting, to the second computing device, data indicative of a gift for display by the second computing device and the tokenized PAN. The method may further include outputting an instruction to debit the gifter financial account with an amount of money based on the transaction in response to determining that a transaction has been executed using the tokenized PAN at the gift-eligible location.

Consistent with the disclosed embodiments, systems and non-transitory computer-readable mediums for providing a gift are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
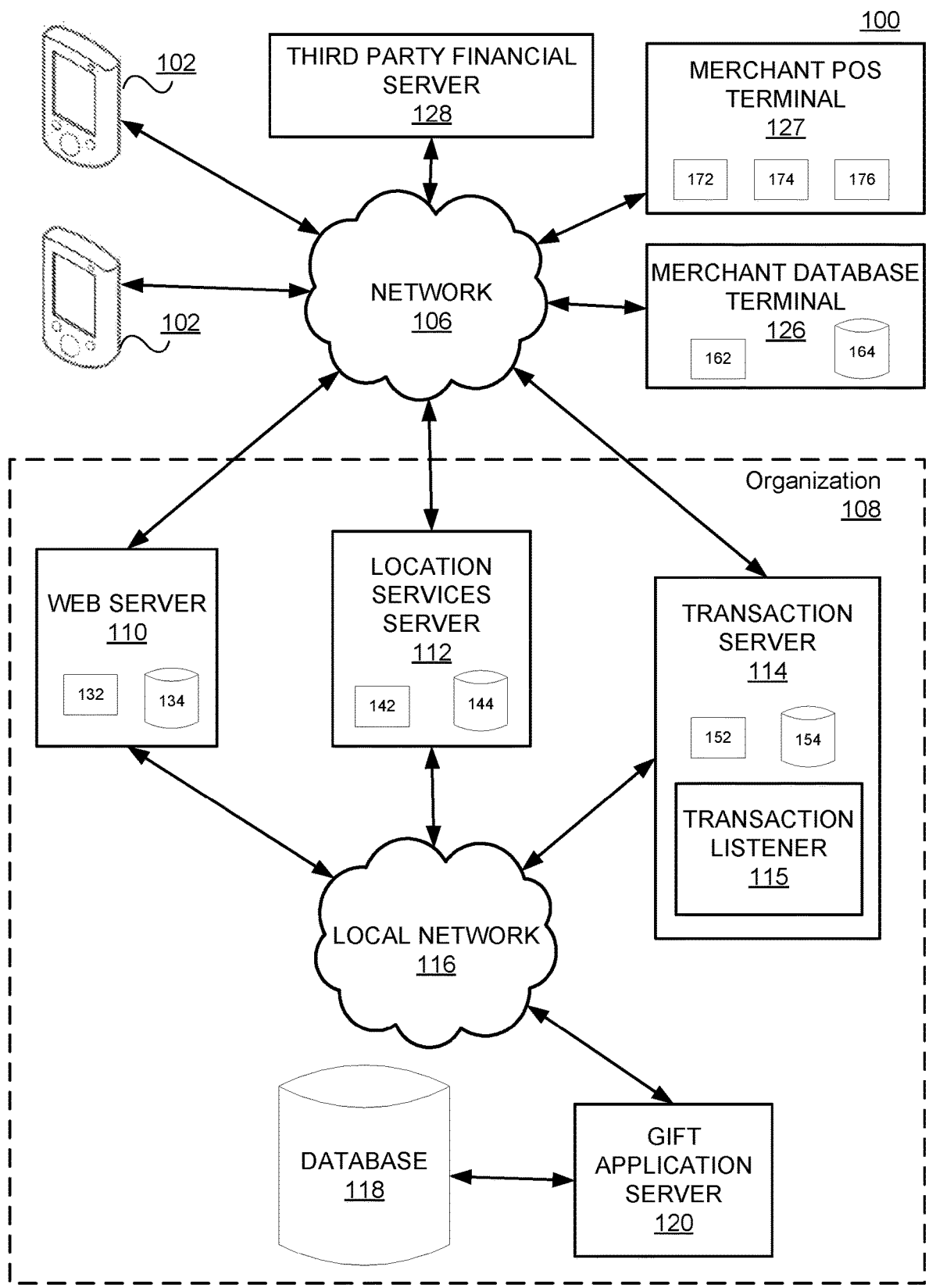
FIG. 1 is a diagram of an exemplary system that may be used to provide a customized location-activated gift.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to methods for providing a customized location-activated gift. In one embodiment, a method may include receiving, from a first computing device associated with a gifter, gift information comprising data indicative of a maximum gift amount, a gift recipient, and a gifter financial account that is associated with the gifter and gift redemption information. The method may include generating a tokenized primary account number (PAN) associated with the gifter financial account. The method may include identifying a second computing device, the second computing device being associated with the gift recipient based on the gift recipient. The method may include determining one or more gift redemption locations based on the gift redemption information. The method may further include receiving gift recipient location data. The method may include determining that the second computing device has entered a gift-eligible location based on the gift recipient location data and the one or more gift redemption locations. The method may include transmitting, to the second computing device, data indicative of a gift for display by the second computing device and the tokenized PAN. The method may further include outputting an instruction to debit the gifter financial account with an amount of money based on the transaction in response to determining that a transaction has been executed using the tokenized PAN at the gift-eligible location.

In another embodiment, a method for providing a customized location-activated gift is disclosed. The method may include receiving, from a first computing device associated with a gifter, gift information comprising data indicative of a maximum gift amount, a gift recipient, a gifter financial account, and gift redemption information. The gifter financial account may be a financial account associated with the gifter. The method may include identifying, based on the gift recipient, a second computing device and a recipient financial account. The second computing device and the recipient financial account may each be associated with the gift recipient. The method may include determining one or more gift redemption locations based on the gift redemption information. The method may include receiving gift recipient location data from the second computing device. The method may include determining, based on the gift recipient location data and the one or more gift redemption locations, that the second computing device has entered a gift-eligible location. The may further include transmitting data indicative of a gift for display by the second computing device to the second computing device. The method may further include outputting an instruction to initiate a transfer of an amount of money from the gifter financial account to the recipient financial account in response to detecting a transaction made at the gift-eligible location in association with the recipient financial account.

In another embodiment, a method for providing a customized location-activated gift is disclosed. The method may include registering a first computing device with a software application to associate the first computing device with a user account of a gift recipient. The method may include transmitting, from the first computing device to a second computing device, location data, wherein the location data is representative of a location of the first computing device. The method may include receiving, by the first computing device and from the second computing device, a gift notification and a tokenized primary account number (PAN) associated with a financial account, wherein the second computing device transmits the gift notification in response to determining that the location of the first computing device corresponds to a redemption merchant location based on the location data. The redemption merchant location may be selected by a gifter associated with the financial account. The method may include displaying, by the first computing device and based on the gift notification, an identification of the gifter, a gift amount and gift redemption information. The method may include conveying, by the first computing device and to a merchant POS device in association with an attempted transaction, the tokenized PAN to pay for at least a portion of the attempted transaction via the financial account, wherein the merchant POS device is associated with the redemption merchant. The method may include receiving, by the first computing device, a notification of the authorization of the attempted transaction. The method may further include adjusting a remaining balance associated with the tokenized PAN based on the notification of the authorization of the attempted transaction.

In another embodiment, a system may include one or more memory devices storing instructions, and one or more processors configured to execute the instructions to perform steps of a method of providing a customized location-activated gift as disclosed herein.

In another embodiment, a non-transitory computer-readable medium is disclosed. The non-transitory computer-readable medium may store instructions that, when executed by one or more processors, cause a system to execute a method of providing a customized location-activated gift as disclosed herein.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to perform one or more processes that may allow a user of a first computing device to create a customized location-activated gift to be automatically provided to a user of a second computing device upon the second computing device entering a designated location or area associated with the gift. According to some embodiments, activation of a gift may mean making the gift available for use by the gift recipient. System 100 may be configured to allow the first user (who may be referred to as the "gifter") to create a gift without making any payment for the gift until the gift is redeemed by the second user (who may be referred to as the "gift recipient"). System 100 may be configured to allow the gifter to specify one or more gift limitations or conditions that constrain the use of the gift, such as for example, a maximum gift amount that the redemption of the gift may not exceed, one or more redemption merchants (e.g., particular stores or vendors) or types of redemption merchants (e.g., restaurants, movie theaters, etc.) at which the gift is authorized to be redeemed, an expiration date by which the gift must be used before it expires, a condition that specifies use of the in association with card not present or card present transactions (i.e. whether or not the a payment card is present for the transaction), conditions on the number of uses of the gift (e.g., one-time use or multiple uses) or any other such types of conditions or limitations that may be created or enforced based on transaction authorization data or via administration of the gift mobile application. System 100 may determine one or more gift redemption locations based on the selected redemption merchants or types of merchants at which the gift may be redeemed. For example, if the gifter specifies that the gift may be redeemed at a particular chain of fast food restaurants, system 100 may determine a plurality of gift redemption locations where each gift redemption location corresponds to a particular restaurant of the chain of restaurants. System 100 may receive location data from a mobile device associated with the gift recipient and based on such location data may determine when the gift recipient has entered a redemption location. Upon determining that the gift recipient has entered a redemption location, system 100 may transmit data indicative of a gift for display by the mobile device of the gift recipient. According to some embodiments, system 100 may then authorize the gift for use in accordance with any conditions placed on the gift, such as the identification of the merchant, the maximum amount of the gift or the date and/or time of the redemption of the gift. In other words, in response to creation of the customized gift by the gifter, system 100 may monitor the location of the gift recipient and activate the gift for use upon determining that the gift recipient has entered a location associated with the gift. In this manner, the system may allow a gifter to surprise a gift recipient with a gift at a time and place where the gift recipient may be inclined to immediately take advantage of the gift. Further, system 100 may allow the gifter to provide customized gifts for merchants or types of merchants that may not require the merchant to preregister with system 100 by utilizing transaction authorization request data to enforce the conditions of the gift.

The components and arrangements shown in FIG. 1 are not intended to limit the disclosed embodiments as the components used to implement the disclosed processes and features may vary. As shown, system 100 may include a pair of user devices 102, a network 106, a merchant database terminal 126, a merchant POS terminal 127, a third party financial server 128, and an organization 108 including, for example, a web server 110, a location services server 112, a transaction server 114, a local network 116, a database 118 and a gift application server 120.

In some embodiments, a gifter and gift recipient may operate separate user devices 102, respectively. User device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of organization 108. According to some embodiments, user device 102 may communicate with a merchant database terminal 126, merchant POS terminal 127 and/or third party financial server 128 via network 106. In some embodiments, user device 102 may include or incorporate electronic communication devices for hearing or vision impaired users. In some embodiments, one or more user devices 102 may include software that is configured to allow a user to generate and send a financial gift to another user (which may be herein referred to as the "gift mobile application").

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization 108 may be associated with an entity such as a business, corporation, individual, partnership, or any other entity that provides one or more of goods, services, and consultations to individuals such as customers. For example, in some embodiments, organization 108 may be associated with a financial services provider.

Organization 108 may include one or more servers, devices, and computer systems for performing one or more functions associated with products and/or services that organization 108 provides. Such servers, devices, and computer systems may include, for example, web server 110, location services server 112, transaction server 114, database 118 and gift application server 120, as well as any other computer systems necessary to accomplish tasks associated with organization 108 or the needs of customers (which may be customers of the entity associated with organization 108).

Web server 110 may include a computer system configured to generate and provide one or more websites accessible to customers, as well as any other individuals involved in organization 108's normal operations. Web server 110 may include a computer system configured to receive communications from user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices of system 100. According to some embodiments, web server 110 may host websites, data or software applications that user device 102 may access and interact with. For example, web server 110 may provide a website, web portal or software application that allows a user of user device 102 to access or view account information associated with one or more financial accounts of the user. In some embodiments, web server 110 may receive and forward communications or portions of communications between user device 102 and components of system 100, such as location services server 112, transaction server 114, database 118 and/or gift application server 120. According to some embodiments, web server 110 may be configured to transmit data and/or messages from a first user device 102 to a second user device 102, via for example, a mobile application that has been downloaded on one or both user devices 102.

Location services server 112 may include a computer system configured to track the location of user device 102 based on information and data received from user device 102. For example, location services server 112 may receive location data from user device 102, such as global positioning satellite (GPS) data comprising the coordinates of the device, RFID data of associated with known objects and/or locations, or network data such as the identification, location, and/or signal strength of a wireless base station (e.g., Wi-Fi router, cell tower, etc.) connected to user device 102 that may be used to determine the location of user device 102. According to some embodiments, location services server 112 may store geofencing information that represents a designed location or area. As those of skill in the art will appreciate, a geofence may be a virtual geographic boundary that when crossed by user device 102, may trigger system 100 to execute one or more actions. According to some embodiments, the contours of a geofence may be predetermined, for example, location services server 112 may receive one or more predetermined geofences that are associated with respective locations from a third party. For example, location services server 112 may receive data representative of a geofence around a particular store from an organization associated with the store that determined the location of the geofence. In some embodiments, the contours of a geofence may be determined by receiving (e.g., from a user of system 100) the location of a point (e.g., longitude and latitude) and a radius and setting the contours of the geofence to be equal to the location of a circle draw around the point at the specified radius. In some embodiments, a geofence may be specified by a user of system 100 by, for example, drawing the geofencing onto a virtual map or otherwise inputting the location of the geofence.

Location services server 112 may have one or more processors 142 and one or more location services databases 144, which may be any suitable repository of location data. Information stored in location services server 112 may be accessed (e.g., retrieved, updated, and added to) via local network 116 and/or network 106 by one or more devices of system 100. In some embodiments, location services server processor 142 may be used to determine the location of user device 102, whether user device 102 has crossed a particular geofence or whether user device 102 is inside or outside of an area designated by a particular geofence. In some embodiments, location services server 112 may be configured send messages and/or data to other devices, such as for example, user device 102 or gift application server 120, upon determining that user device 102 has crossed a specified geofence or entered an area encompassed by a specified geofence. For example, in some embodiments, location services server 112 may be configured to trigger system 100 to send to user device 102 a notification that the user of user device 102 has received a gift, and may provide, for example, the details of the gift, such as the amount of the gift, the authorized redemption merchants or types of redemption merchants, and restrictions on the timing of the use of the gift. According to some embodiments, location services server 112 may receive data representative of a location that is associated with a gift. For example, gift application server 120 may provide data to location services server 112 representative of a location of a particular store that is associated with a particular gift. Location services server 112 may generate, receive or access geofence information associated with the received location and may monitor location data associated with the user device 102 of a designated gift recipient to determine when the user device 102 has entered the location. Location services server 112 may determine that user device has entered the location by determining that, for example, user device has crossed over the geofence associated with the gift. In this way, location services server 112 may determine when a gift recipient has entered a location or proximity to a redemption merchant specified by the gifter, such as a gift redemption location, as discussed in greater detail below.

Transaction server 114 may include a computer system configured to process one or more transactions involving a financial account associated with a customer. For example, a transaction may be a purchase of goods or services from a merchant that is made in association with a financial account, such as a bank account or a credit card account. Transactions may be made at merchant POS terminal 127 by for example, swiping a credit card or making a payment using financial account information stored on a smartphone in a digital wallet. Such transactions may be made at merchant locations or at a merchant website via the internet. Transactions may be made using for example, a credit card, a debit card, a gift card, or other ways of conveying financial account numbers and/or account credentials that are known in the art. Transaction server 114 may have one or more processors 152 and one or more transaction server databases 154, which may be any suitable repository of transaction data. Information stored in transaction server 114 may be accessed (e.g., retrieved, updated, and added to) via local network 116 and/or network 106 by one or more devices of system 100. According to some embodiments, transaction server 114 may store account numbers, such as primary account numbers (PANs) associated with credit/debit cards or other such financial account numbers, that may be used in transaction monitoring as described in greater detail below. Such account numbers may be associated with for example, financial accounts that are associated with the gift recipient or a tokenized PAN associated with a financial account of the gifter. According to some embodiments, a tokenized PAN may be a temporary PAN linked to an underlying financial account (e.g., the gifter's credit card account) that allows a user to make purchases against the financial account within predetermined limitations, such as at predetermined merchants, merchant categories, geographic areas or time periods. In some embodiments, transaction server 114 may store rules, conditions, restrictions or other such limitations that are associated with a gift and that may be applied to an attempted transaction to determine if the attempted transaction should be authorized and/or identified as a gift-eligible transaction.

According to some embodiments, transaction server 114 may receive transaction authorization data and/or requests from one or more merchant POS terminals 127 based on an attempted transaction made at a merchant. For example, if a purchaser swipes a credit card at card reader associated with merchant POS terminal 127 or types in a credit card number on a website to make a purchase, merchant POS terminal 127 may generate a transaction authorization request and transmit the transaction authorization request to transaction server 114. Such transaction authorization requests may include data indicative of a financial account (e.g., a PAN or account number) used to make a purchase, a time stamp, and merchant code associated with the merchant and/or location at which the attempted purchase was made. According to some embodiments, transaction server 114 may determine whether to authorize a transaction and/or whether the transaction is a gift-eligible transaction based on the transaction authorization request and any conditions or limitations associated with a gift that is associated with the transaction and the method of providing the gift. For example, in some embodiments, a gift may be provided to the gift recipient as a tokenized PAN that may be used as a payment method by the gift recipient at merchant POS terminal 127. In some embodiments, a gift may be provided to the gift recipient in the form of a funds transfer or reimbursement to a financial account of the gift recipient, in response to determining that a gift-eligible transaction was made using a financial account associated with the gift recipient. In either case, the associated gift may include conditions such as a specified redemption merchant or window of time at which the gift may be used. Thus, in some embodiments, transaction server 114 may identify attempted transactions made by the gift recipient based on monitoring transaction authorization data, and then may further determine whether the attempted transaction is authorized or designated as a gift-eligible transaction by applying the associated gift limitations to the data associated with the transaction authentication request. Attempted transactions that satisfy the associated gift limitations may be referred to as gift-eligible transactions.

In some embodiments, in response to authorizing a transaction, transaction server 114 may store a record of the transaction and update account information such as the balance of the account. Although the preceding description was made with respect to a credit card, it should be understood that other embodiments relating to other types of payment methods such as debit cards, gift cards, and any other such type of financial account, including online financial accounts, are contemplated as well.

According to some embodiments, transaction server 114 may determine the identity of a merchant associated with an attempted transaction based on the merchant category code (which may be referred to herein as a "merchant code") included in the transaction authorization data and/or other transaction authorization data such as the zip code and country code. For example, in some embodiments, transaction server 114 may be configured to determine the identity of the business, such as a particular chain of fast food restaurants, based on the merchant category code. According to some embodiments, transaction server 114 may determine information about the merchant associated with a transaction such as the merchant's name, type/category of merchant, location, address and the like, by utilizing third party data and/or machine learning techniques to derive such information. According to some embodiments, transaction server 114 may be configured to determine one or more of a merchant description, a merchant name, a merchant location/address/zip code/country code based on a transaction ID associated with the transaction. In some embodiments, transaction server 114 may be configured to determine the location or address of the attempted purchase based on the merchant category code or other data provided with a transaction authorization request. According to some embodiments, if the identity of the merchant may not be determined solely based on the merchant category code, it may be determined based on the merchant category code in conjunction with the location information derived from the transaction authorization request. In some embodiments, transaction server 114 may be configured to determine the type of business at which the attempted transaction is made based on the merchant category code, such as whether the merchant is a restaurant, gas station, book store, movie theater or the like. In some embodiments, transaction server 114 may cleanse the raw transaction data and output transaction data that human readable. For example, transaction server 114 may receive transaction authorization data associated with a transaction that has a transaction ID of NCPI567 and may cleanse the transaction to output that the transaction took place at a restaurant called "Burger Joint" that is located at 123 Main Street. By using transaction authorization request data to identify the merchant at which a gift is used, system 100 may allow a gifter to create a customized gift to a wide variety of merchants without requiring the merchant to be registered with the system, thereby allowing a user to create a customized gift to a merchant at which gifts may not otherwise be available for purchase.

According to some embodiments, transaction server 114 may include a transaction listener 115 that may be configured to monitor transaction authorization data that originates from, for example, one or more merchant POS terminals or devices. According to some embodiments, transaction listener 115 may monitor incoming transaction authorization requests to identify attempted transactions that are associated with one or more stored account numbers of PANs. For example, for each attempted transaction, transaction listener 115 may compare a PAN/account number associated with the attempted transaction with a specified PAN/account number to identify all attempted transactions associated with the specified PAN/account number. For example, transaction listener 115 may identify one or more attempted transactions associated with a particular credit card account by monitoring transaction authorization request data to identify attempted transactions that were made in association with payment method associated with a PAN that matches the PAN of the specified credit card. According to some embodiments, transaction listener 115 may receive transaction authorization requests in real time if, for example, a financial account associated with the attempted payment method is part of a network associated with organization 108. In some embodiments, transaction listener 115 may receive a batch of transaction authorization requests at a particular time, such as at the end of the day, if, for example, the financial account associated with the attempted payment method is not part of a network associated with organization 108. Accordingly, in some embodiments, transaction listener 115 may monitor transaction authorization data in real time (or, in very close temporal proximity to when each attempted transaction is made), and in some embodiments transaction listener 115 may monitor transaction authorization data in batches at specified intervals, or some combination of both. In this way, transaction server 114 may be configured to monitor, identify and authorize or reject and/or classify as gift-eligible attempted transactions associated with a specified financial account in real time and/or intermittently at intervals.

According to some embodiments, transaction server 114 may be configured to send and/or initiate payments from a financial account in response to authorizing an attempted transaction associated with the account. For example, if transaction server 114 authorizes a particular transaction made using a specified financial account at a merchant, then transaction server 114 may generate an instruction to debit the specified financial account with the amount of the transaction and credit an account associated with the merchant with the same amount. In some embodiments, if transaction server 114 authorizes an attempted transaction associated with a tokenized PAN, then transaction server may initiate a payment from an account associated with the tokenized PAN (such as a financial account of the gifter) to a merchant at which the payment was made. According to some embodiments, transaction server 114 may initiate a funds transfer, such as an ACH transfer for example, from a financial account associated with a gifter to a financial account associated with a gift recipient upon detecting a gift-eligible transaction associated with an account of the gift recipient. According to some embodiments, if the funds are being transferred between two accounts that are both associated with an entity associated with organization 108, such transfers may occur instantaneously or substantially instantaneously. According to some embodiments, if one or more of the accounts involved in the transfer is not associated with an entity associated with organization 108, then transaction server may communicate with third party financial server 128 to carry out the transfer and there may be a delay of, for example, one or two business days in transferring the funds.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In other embodiments, components of organization 108 may communicate via network 106, without a separate local network 116.

According to some embodiments, database 118 may be a database associated with organization 108 and/or its related entity that may store a variety of information relating to customers, transactions, customer information, and business operations. Database 118 may also serve as a back-up storage device and may contain data and information that is also stored on, for example, local databases associated with web server 110, location services server 112, transaction server 114, or gift application server 120. Database 118 may be accessed by other devices and may be used to store records of every interaction, communication, and/or transaction a particular customer has had with organization 108 and/or its related entity. According to some embodiments, database 118 may store data associated with current or past gifts sent or received by users of system 100, such as for example, data identifying a sender of a gift, a receiver of a gift, an amount of a gift, an account designated to pay for the gift or to receive a reimbursement for the gift, the stores and/or types of stores that the gift is authorized to be redeemed at, electronic lock information associated with a gift, an expiration and/or an authorized usage date of a gift, and any other such information that may be pertinent to the provision of a gift.

Gift application server 120 may include a computer system configured to facilitate the purchase and provision of a gift from a gifter that may be associated with a first user device 102 to a gift recipient that may be associated with a second user device 102. According to some embodiments, gift application server 120 may generate an electronic gift associated with a gifter financial account in response to receiving gift information via, for example, a software application running on user device 102.

For example, according to some embodiments, gift application server 120 may receive a gift creation request, including gift information or a gift token creation request, from user device 102 that is associated with the gifter. The gifter may, for example, specify features and conditions of the gift, that may include one or more of a selection of the gift recipient, a gift account that is associated with the gifter from which the funds for the gift will be taken from or debited against, a gift amount, one or more redemption merchants, one or more types of redemption merchants, one or more redemption locations, or a specified timeframe in which the gift must be redeemed. According to some embodiments, the selection of a gift recipient may be any information sufficient to identify an individual, such as a name, a username, a handle, a phone number, an address, an email address, or the like. In some embodiments, both the gifter and the gift recipient may have preregistered user accounts with a gift mobile application that may store financial account numbers of the respective users and may allow the gifter to easily identify and select the individual the gifter is designating as the gift recipient. According to some embodiments, based on the gift creation request, gift application server 120 may take steps to prepare a gift for use prior to activation of the gift. For example, in some embodiments, where the gift may be delivered in the form of a tokenized PAN sent to a device associated with the gift recipient, gift application server 120 may generate a tokenized PAN associated with to a specified account of the gifter to be authorized for use and/or transmitted to user device 102 of the gift recipient upon activation of the gift. In some embodiments, where the gift may be delivered in the form of a reimbursement made from a financial account of the gifter to a financial account of the gift recipient, gift application server 120 may identify one or more financial accounts of the gift recipient that may be used in transaction monitoring upon activation of the gift to determine if a particular transaction is gift-eligible.

According to some embodiments, in response to receiving a gift creation request, gift application server 120 may determine one or more gift redemption locations that correspond to locations of one or more merchants of types of merchants that are specified by the gift request. For example, if the gifter specifies that the gift is for a particular chain of movie theater, gift application server 120 may determine one or more gift redemption locations that correspond to locations of the specified chain of movie theaters. Alternatively, if the gifter specifies that the gift is for movie theaters generally, then application server 120 may determine one or more gift redemption locations that correspond to locations of any movie theater. In some embodiments, gift application server 120 may determine the gift redemption locations by accessing a stored list of gift redemption locations that correspond to particular merchants and types of merchants. In some embodiments, gift application server 120 may determine the gift redemption location(s) by communicating with a merchant database terminal 126 to obtain the locations of merchant stores from the merchant directly. In some embodiments, gift application server 120 may determine the gift redemption location(s) by searching the internet to determine one or more addresses associated with the specified merchant or type of merchant, in a particular region for example. According to some embodiments, gift application server 120 may determine gift redemption locations that are within a predetermined distance of a location specified by the gifter (e.g., via a software application), a location of the gifter (as determined by location data received from gifter user device 102) or a location of the gift recipient (as determined by location data received from gift recipient user device 102). According to some embodiments, gift redemption locations may be defined by an area associated with a geofence, a coordinate or point on a map, or an area on a map that is defined by a radius extending from a point or coordinate on a map. According to some embodiments, a gift redemption location may be designated by the position of one or more devices or beacons associated with a merchant or merchant POS terminal 127. For example, a gift redemption location may be defined by a particular Wi-Fi network that is associated with a merchant POS terminal, such that when user device 102 connects to the Wi-Fi network, user device 102 may then be considered to be at the gift redemption location. In some embodiments, a gift redemption location may be defined by one or more beacons placed at a location that may be detectable by user device 102, via for example, detecting a radio frequency signal or the like. According to some embodiments, based on the detected signal beacon, user device 102 may be able to determine the identity of the location (e.g., a name of a store and/or an address) and an approximately how far away from the location user device 102 is.

According to some embodiments, after determining one or more gift redemption locations, gift application server 120 may monitor the location of gift recipient's user device 102 to determine if and when the gift recipient has entered the gift redemption location. Accordingly, in some embodiments, system 100 may receive location data from user device 102, such as for example, global positioning satellite (GPS) data or wireless access point connection information associated with the gift recipient user device 102. According to some embodiments, wireless access point connection data may include the location of one or more wireless access points, such as Wi-Fi routers, cellular telephone towers or any other such wireless transmitter that may be associated with a location. According to some embodiments, system 100 may determine the location of the gift recipient user device 102 by based on the locations of the one or more wireless access points by, for example, comparing the wireless access points that are visible to the gift recipient user device 102 to the known locations of the wireless access points. In some embodiments, system 100 may receive wireless access point information over time and may determine the location of the gift recipient user device 102 by performing triangulation of the signals and/or by tracking the change in signal strength of each wireless access point as detected by the gift recipient user device 102 over time. In some embodiments, gift recipient location data may include visual information obtained from an image capture device associated with the gift recipient user device 102, from which system 100 may determine the approximate location of user device 102 by, for example, performing image recognition on the image to identify a sign or landmark.

According to some embodiments, system 100 may prevent a gift that has not yet been activated from being redeemed. Thus, in some embodiments, upon determining that the gift recipient user device 102 has entered a gift redemption location, gift application server 120 may activate the associated gift so that it may be redeemed. In some embodiments, activating a gift may include transmitting a tokenized PAN to gift recipient user device 102 for use by the gift recipient and initiating of monitoring of transaction authorization data to identify a purchase made with the tokenized PAN in accordance with any specified gift limitations. In some embodiments, activating a gift may include initiating monitoring of transaction authorization data to identify a purchase made with a known financial account of the gift recipient in accordance with any specified gift limitations (i.e., a gift-eligible purchase) and initiating a funds transfer to reimburse the gift recipient from an account of the gifter for the cost of the gift-eligible purchase. In some embodiments, upon determining that the gift recipient user device 102 has entered a gift redemption location, gift application server 120 may cause system 100 to generate and send a notification to the gifter and/or gift recipient via for example, text message, email or through a mobile application installed on user device 102, to provide a notice that the gift has been activated and to provide details of the gift such as the gift amount and any limitations on the gift that were specified by the gifter. In this way, system 100 may allow a gifter to create a customized, location-activated gift that will only activate upon system 100 determining that gift recipient's user device 102 has entered a gift redemption location. Thus, system 100 may enable gifter to generate a surprise gift that may only be redeemed in accordance with limitations set by the gifter and at a location specified by the gifter. According to some embodiments, system 100 may be configured to allow gifter to specify a date before or after which the gift may not be activated. For example, a gifter may create a gift for use at a particular chain of movie theaters but may specify that the gift may not be activated until after a specified date, and so if the gift recipient visits one of the specified movie theaters prior to the specified date, the gift will not be activated, but may be activated in the future if the gift recipient visits one of the specified movie theaters after the specified date.

Merchant database terminal 126 may have one or more processors 162 and one or more merchant databases 164, which may be any suitable repository of merchant data. Merchant database terminal 126 may be located at the POS location, off-site at another merchant location, or at a third-party location. Information stored in merchant database terminal 126 may be accessed (e.g., retrieved, updated, and added to) via network 106 by one or more devices (e.g., service provider terminal 110) of system 100. In other embodiments, merchant POS terminal 127 may be configured to process online transactions on behalf of the associated merchant. Merchant database 164 may store information relating to products and services offered by merchants such as pricing, quantity, availability, discounts, reviews, and any other such generally available information that a consumer may utilize in making a purchasing decision. In some embodiments, merchant database 164 may also include location information associated with products and services that identifies the location(s) that a particular product or service is available for purchase. In some embodiments, the location information may include an identification of a particular store, terminal, or kiosk that the product or service may be purchased from.

Merchant POS terminal 127 may have one or more POS devices 172, 174, 176 that communicate with one or more devices (e.g., user device 102) of system 100 via network 106. In some embodiments, POS devices 172, 174, 176 may devices that are configured to receive or obtain payment information from user device 102. For example, one or more POS devices 172 174, 176 may include a near-field communication interface, a Bluetooth communication interface, a WiFi communication interface, or any other such communication interface that may enable communication between merchant POS terminal 127 and user device 102. In some embodiments, one or more POS devices 172, 174, 176 may include a scanner for scanning images or data that convey payment information displayed by user device 102, an image capture device for capturing images displayed by user device 102, a card-reading device for obtaining payment information from a card (e.g., by reading a chip imbedded in the card or reading information from a magnetic strip), or a keypad for receiving a user input representative of payment information (e.g., a typed credit card number).

Third party financial server 128 may include a computer system configured to store information related financial accounts, such as checking accounts, savings accounts, credit cards accounts, and the like. For example, third party financial server 128 may store account numbers, PANs, balances, transaction data, fund transfer information, and user account information. According to some embodiments, a gifter and/or a gift recipient may have one or more financial accounts associated with third party financial server. In some embodiments, transaction server 114 and/or gift application server 120 may be configured to send instructions to third party financial server 128 via network 106 to cause third party financial server 128 to debit a financial account associated with third party financial server 128 or initiate a transfer of funds between financial accounts, such as an account of the gifter and an account of the gift recipient. Accordingly, in some embodiments, gift application server 120 may store login credentials of financial accounts associated with the gifter and/or gift recipient and transmit such credentials to third party financial server 128 as necessary to initiate such transactions.

Although the preceding description describes various functions of a web server 110, location services server 112, transaction server 114, database 118, gift application server 120, merchant database terminal 126, merchant POS terminal 127 and third party financial server 128, in some embodiments, some or all of these functions may be carried out by a single computing device. For example, some or all of the functions of web server 110, location services server 112, transaction server 114, database 118 and gift application server 120 may be carried out by a single device.

For ease of discussion, embodiments may be described in connection with use of a mobile application on a mobile device to create, customize, send and receive, and in particular, financial gifts that may be redeemed at specified merchants. It is to be understood, however, that disclosed embodiments are not limited to use of a mobile application on a mobile device, but also contemplates embodiments using desktop computers to create, send and/or receive electronic gifts as well as the printing of indicia of a received gift for redemption at a merchant by a printer associated with a computing device of the gift recipient. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high level code that can be executed by a processor using an interpreter.

Figure 2:
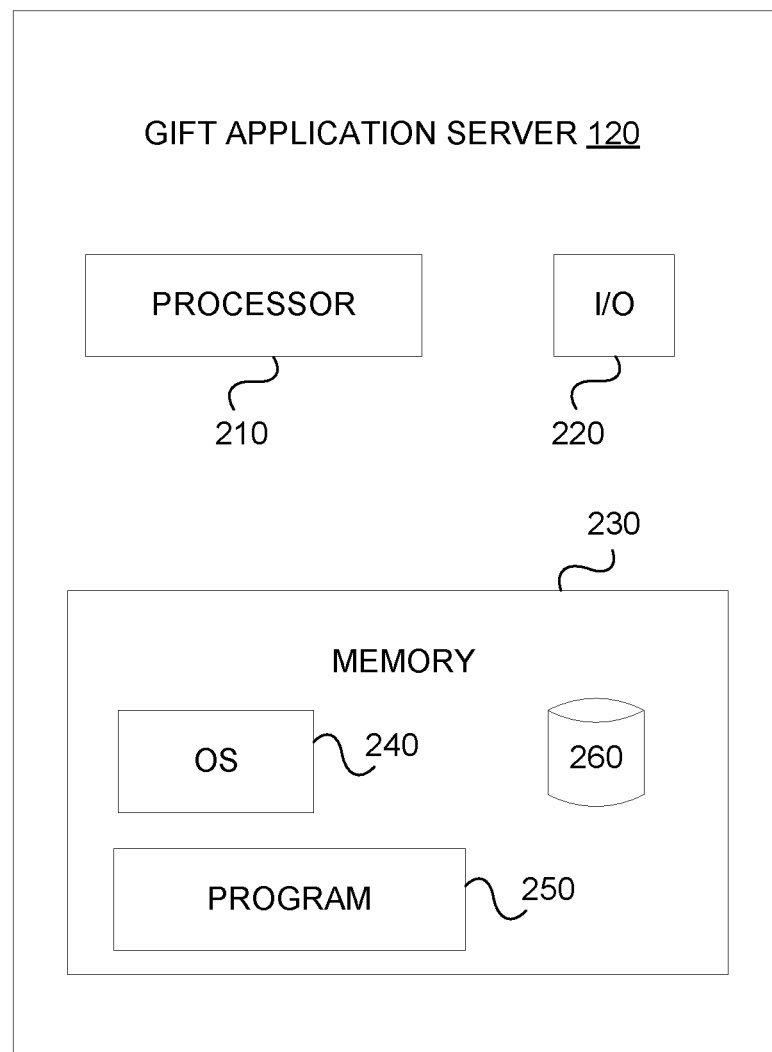
FIG. 2 is a component diagram of an exemplary gift application server.

An exemplary embodiment of gift application server 120 is shown in more detail in FIG. 2. Web server 110, location services server 112, transaction server 114, merchant database terminal 126, merchant POS terminal 127, third party financial server 128 and/or user device 102 may have a similar structure and may include many components that are similar to or even have the same capabilities as those described with respect to gift application server 120. As shown, gift application server 120 may include a processor 210, an input/output ("IO") device 220, a memory 230 containing an operating system ("OS") 240 and a program 250. For example, gift application server 120 may be a single device or server or may be configured as a distributed computer system including multiple servers, devices, or computers that interoperate to perform one or more of the processes and functionalities associated with the disclosed embodiments. In some embodiments, gift application server 120 may further include a peripheral interface, a transceiver, a mobile network interface in communication with the processor 210, a bus configured to facilitate communication between the various components of gift application server 120, and a power source configured to power one or more components of gift application server 120.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Gift application server 120 may include one or more storage devices configured to store information used by processor 210 (or other components) to perform certain functions related to the disclosed embodiments. In some embodiments, gift application server 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, gift application server 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, gift application server 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments. In some embodiments, gift application server 120 may include a program that when executed, processes a request from a gifter to provide a gift to a gift recipient and creates, provides and administers the gift as disclosed herein.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable gift application server 120 to perform one or more of the processes and functionalities associated with the disclosed embodiments.

Gift application server 120 may also be communicatively connected to one or more memory devices (e.g., databases) locally or through a network. The remote memory devices may be configured to store information and may be accessed and/or managed by CSR terminal 122. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases.

Gift application server 120 may also include one or more I/O devices 220 that may comprise one or more interfaces for receiving signals or input from devices and providing signals or output to one or more devices that allow data to be received and/or transmitted by gift application server 120. For example, gift application server 120 may include interface components, which may provide interfaces to one or more input devices, such as one or more keyboards, mouse devices, touch screens, track pads, trackballs, scroll wheels, digital cameras, microphones, sensors, and the like, that enable gift application server 120 to receive data from one or more users. Gift application server 120 may include a display, a screen, a touchpad, or the like for displaying images, videos, data, or other information.

In exemplary embodiments of the disclosed technology, gift application server 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Figure 3:
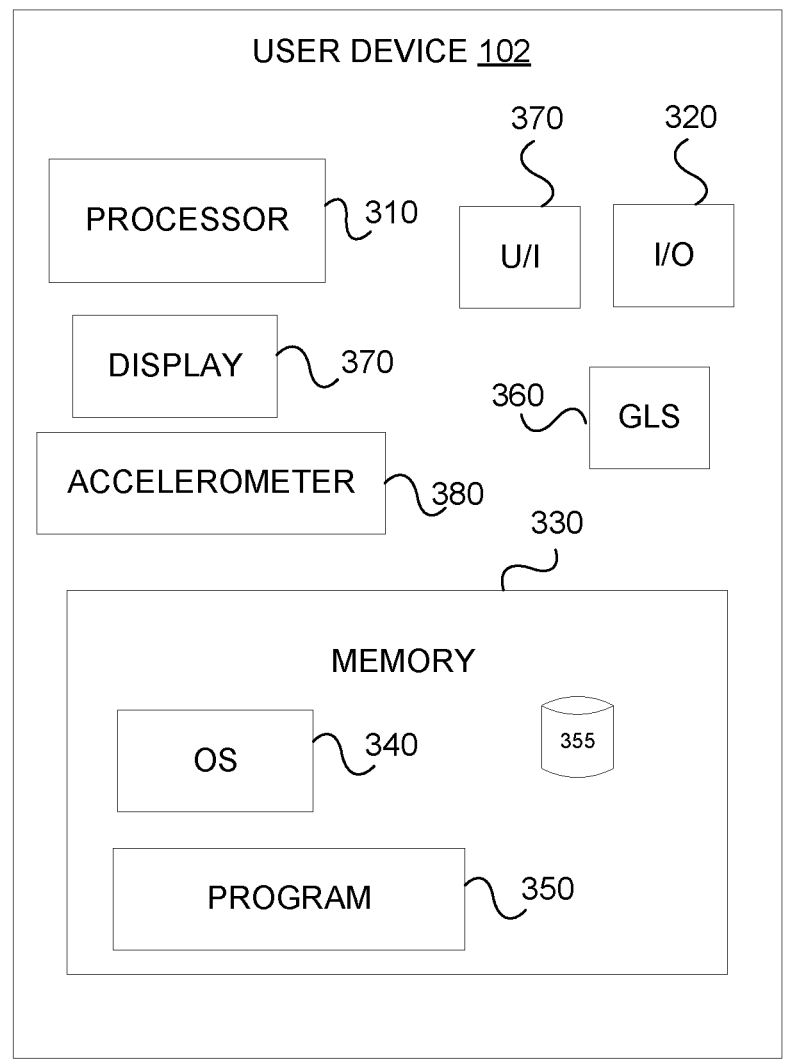
FIG. 3 is a component diagram of an exemplary user device.

FIG. 3 shows an example embodiment of user device 102. As shown, user device 102 may include a processor 310; an input/output ("I/O") device 320; a memory 330 containing an operating system ("OS") 340, a database 355, which may be any suitable repository of data, which may include a digital wallet for storing digital gifts and payment information, and/or a program 350; a geographic location sensor ("GLS") 360 for determining the geographic location of user device 102; a user interface ("U/I") device 370 for receiving user input data, such as data representative of a click, a scroll, a tap, a press, or typing on an input device that can detect tactile inputs; a gyroscope and/or an accelerometer 380 and/or any other sensor configured to detect motion of user device 102; and/or a display 390 for displaying digital images and/or video. As described in greater detail below, in some embodiments, program 350 may include a gift mobile application that may be a software application configured to run on user device 102. According to some embodiments, the gift mobile application may allow users to create, customize, send and receive electronic gifts as described further herein. In some embodiments, user input data may include biometric data associated with a user of user device 102 obtained by one or more sensors, such as a fingerprint scanner, a microphone, an image capture device, and the like. According to some embodiments, biometric data may be used to authenticate a user prior to creating, customizing, sending or utilizing an electronic gift. For example, in some embodiments, the gift mobile application may require a user to authenticate themselves using, for example, fingerprint data obtained from a fingerprint scanner of user device 102 prior to sending or using an electronic gift. It will be understood that other such authentication methods such as facial recognition, voice recognition, gesture recognition, username/password login, multi-factor authentication (e.g., sending a user an authentication code via an email or text message) and the like may also be used in a similar manner. In some embodiments, I/O device 320 may include a transceiver for sending and receiving wireless signals, such as Wi-Fi, cellular, Bluetooth, near-field communication, and any other such type of signal. In some embodiments, user device 102 may further include a peripheral interface, a mobile network interface in communication with processor 310, a bus configured to facilitate communication between the various components of user device 102, and/or a power source configured to power one or more components of user device 102. According to some embodiment, electronic gifts may be transmitted and stored using standard encryption techniques to add additional security. The various components of user device 102 may include the same or similar attributes or capabilities of the same or similar components discussed with respect to gift application server 120.

Figure 4B:
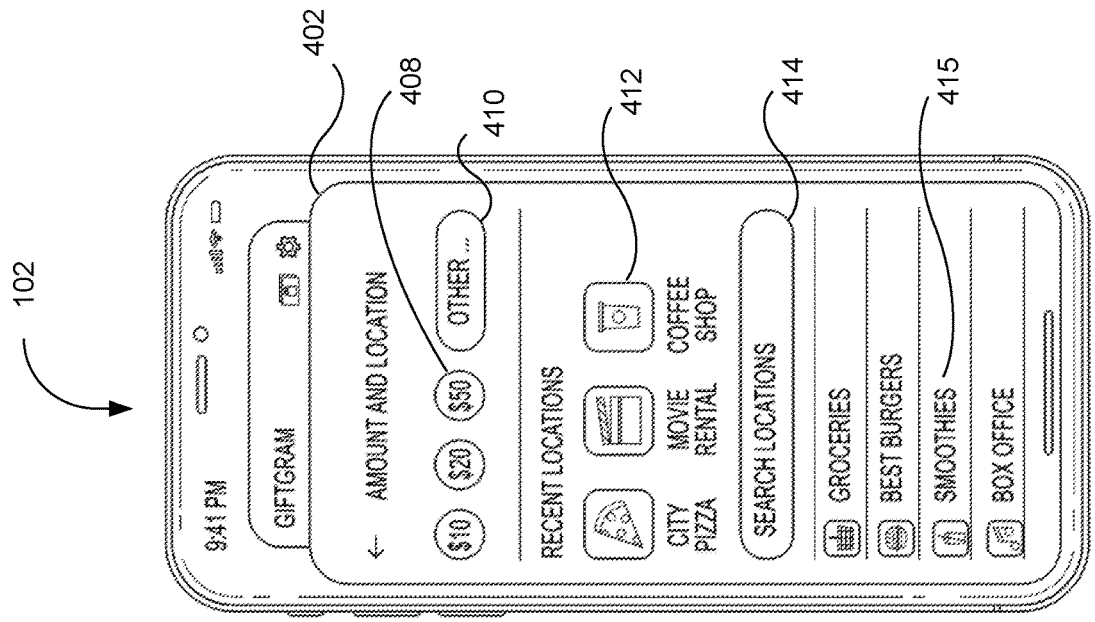
FIGS. 4A-B are exemplary embodiments of user interfaces of a software application for providing gifts.
Figure 4A:
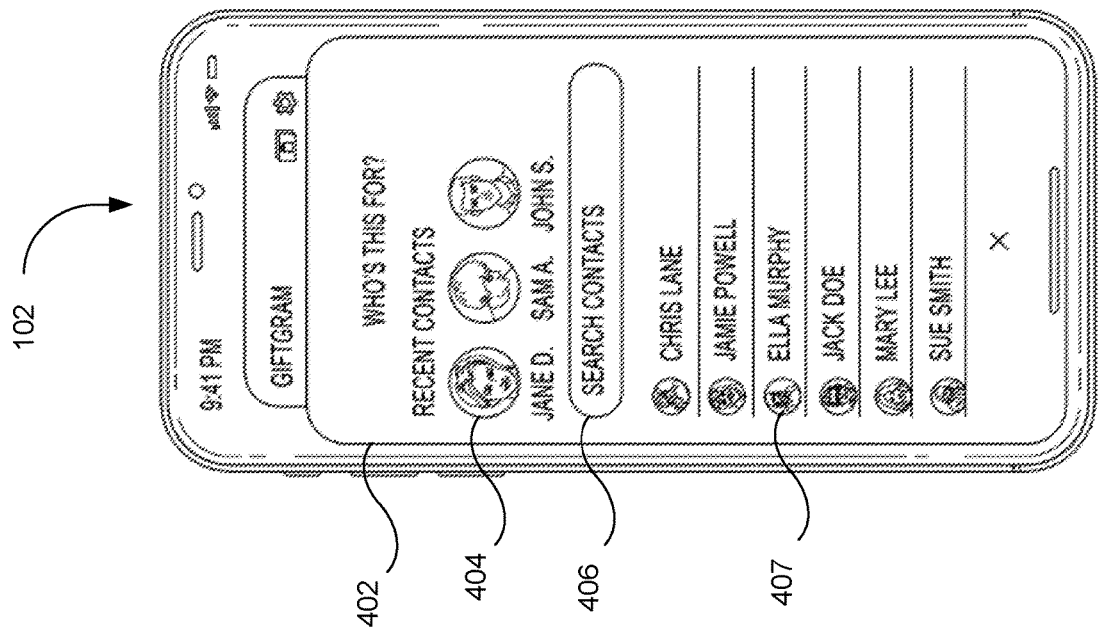

FIGS. 4A-B show example embodiments of user interfaces of a gift mobile application 402 being run on user device 102. According to some embodiments, gift mobile application 402 may be a software application that is configured to allow a gifter to create, customize and send a gift to a selected gift recipient using a first user device 102. According to some embodiments, a gift recipient may have a second user device 102 that may receive a gift sent by the gifter. In some embodiments, second user device 102 may receive the gift via gift mobile application 402 that is installed on second user device 102. In some embodiments, second user device 102 may not have gift mobile application 402 installed, but may be configured to receive the gift via, for example, an email or a text message. FIG. 4A shows an example embodiment of a user interface of gift mobile application 402 that is configured to allow a gifter to select a gift recipient and FIG. 4B shows an example embodiment of a user interface of gift mobile application 402 that is configured to allow a gifter to select and configure a gift to send to the selected gift recipient. According to some embodiments, gift mobile application 402 may facilitate communication between user device 102 and gift application server 120. In some embodiments, gift mobile application 402 may facilitate communication or the sending of messages between gifter user device 102 and gift recipient user device 102. For example, gift mobile application 402 may enable the gift recipient to record and send a thank you message to the gifter, or in some embodiments may initiate a telephonic or video link between gifter user device 102 and gift recipient user device 102 upon the gift recipient receiving or using the gift. According to some embodiments, if a telephonic or video link cannot be established immediately (e.g., due to a user being out of cell tower range), mobile application 402 may automatically attempt to establish the link upon detecting a user device 102 has reconnected to a network (e.g., Wi-Fi, cellular, etc.) or may intermittently try to establish the link upon after a period of time has passed.

According to some embodiments, user device 102 may provide gift mobile application 402 with access to a contacts list stored by user device 102, so that a user of gift mobile application 402 may select a stored contact as a gift recipient. As will be appreciated by those of skill in the art, a contacts list may comprise a plurality of records, where each record corresponds to an individual or entity and includes associated stored contact information such as a name, telephone number(s), address(es), and other such information. As shown in FIG. 4A, a user interface of gift mobile application 402 may allow a gifter to select a recent contact 404 as the gift recipient by selecting a displayed image or name associated with the recent contact 404. In some embodiments, a recent contact 404 may represent an individual that the gifter has given a gift to in the recent past via gift mobile application 402. In some embodiments, a recent contact 404 may represent an individual that a user has communicated with via user device 102 (e.g., via phone call, text message, email, etc.) in the recent past. According to some embodiments, a user interface of gift mobile application 402 may allow a gifter to specify a gift recipient by searching for a name of an individual using a text search field 406, which may cause gift mobile application 402 to perform a search of the contacts list stored on user device 102. According to some embodiments, a user interface of gift mobile application 402 may display some or all of a list of contacts 407 from which to select a gift recipient. In some embodiments, the displayed list of contacts 407 may be configured to scroll to reveal a different portion of the list in response to receiving a user input, such as a vertical swipe on a touchscreen of user device 102.

In some embodiments, gift mobile application 402 may be configured to allow a gifter to select a plurality of gift recipients and the gifter may specify whether an identical gift is to be sent to all of the gift recipients individually, or whether a single gift is to be sent to all of the gift recipients for their collective use. For example, a gifter may send three friends a gift of $100 to collectively spend at a particular restaurant, meaning that the gift will be exhausted when $100 is spent at the restaurant by any one of the gift recipients, or when the total amount of the gift is spent by adding up the expenditures of all three gift recipients at the restaurant. Furthermore, in some embodiments, a gifter may send a location-based group gift in which the gifter specifies a redemption location and conditions the gift on the occurrence that all gift recipients must be at the location to utilize the gift. For example, if a gifter wants two friends to meet for lunch, the gifter may create a gift to a particular restaurant but specify that both friends must be physically present at the restaurant in order for the gift to be used. In some embodiments, a gifter may specify an unknown gift recipient based on a specified merchant or location. For example, if a gifter is buying a cup of coffee and they want to buy a coffee for the person in line behind them, they may select a "pay it forward" feature of the gift mobile application 402 that may allow the gifter to provide a gift to the next person who makes a purchase from the location at which the gifter has just made a purchase. In some embodiments, if the next person in line has a financial account with an entity associated with organization 108, then system 100 may be able to identify a financial account of the next person in line immediately as system 100 may have access to the person's financial records. In some embodiments, if the next person in line does not have a financial account associated with an entity associated with organization 108, then system 100 may identify the person's financial account based on an exchange with third party financial server 128, or may simply wait for the next purchase made by a person who does have a financial account associated with organization 108.

As shown in FIG. 4B, in some embodiments, a user interface of gift mobile application 402 may allow a gifter to select and/or configure a gift to send to a gift recipient by inputting or selecting a gift amount, which may also be referred to as a maximum gift amount, and one or more redemption locations. The gift amount may represent the maximum amount of value that may be withdrawn from an account associated with the gifter in relation to the gift. The one or more redemption merchants may represent merchants, ecommerce websites, stores, or locations at which the gift is authorized to be used. For example, the gift recipient may select a movie theater chain as the redemption merchant, which means that the gift recipient would only be authorized to redeem the gift at the specified movie chain. According to some embodiments, gift mobile application 402 may provide a number of predetermined gift amounts 408 that may be selected by the gifter. In some embodiments, the gifter may type in a customized gift amount via a gift amount input field. Gift mobile application 402 may provide a number of predetermined or recent redemption merchants 412 that may be selected by the gifter selecting an icon or button associated with the associated redemption merchant 412. According to some embodiments, gifter may search for redemption merchants by inputting the name of a desired redemption merchant into redemption merchant search field 412. According to some embodiments, gift application server 120 may store a list of redemption merchants that are compatible for use with system 100 and gift mobile application 402 may communicate with gift application server 120 in response to a search entered into redemption merchant search field 414 to receive search results. According to some embodiments, gift mobile application 402 may provide a list of redemption merchants 415 that may be displayed and manipulated in a manner similar to the list of contacts 407 shown in FIG. 4A. In some embodiments, gift mobile application 402 may allow a gifter to designate a type of redemption merchant instead of a particular redemption merchant. For example, instead of selecting a particular movie theater chain, the gifter may instead select "movie theaters," and system 100 may enable the gift to be used at a plurality of different movie theaters and chains of movie theaters based on a classification of the merchant determined by system 100 when the gift is redeemed.

Including and in addition to aspects shown in FIGS. 4A-B, in some embodiments, gift mobile application 402 may be configured to enable a gifter to specify or customize various other aspects of a gift, including, but not limited to, the gift recipient, the merchant identity, merchant type, redemption location, the amount of the gift, media associated with the gift (e.g., messages, images, videos, look and feel of the gift, artwork and the like sent in association with the gift), an account associated with the gifter from which to fund the gift, an account associated with the gift recipient for receiving payments or reimbursements relating to the gift, an expiration date and/or time of the gift after which the gift will no longer be valid for use, an authorized use date and/or time of the gift before which the gift may not be authorized for use, an electronic locking mechanism associated with the gift that is described in greater detail below. Further, in some embodiments, gift mobile application 402 may be configured to send and/or receive messages from giftram application server 120 or another user device 102. For example, in some embodiments, user device 102 associated with the gifter may receive notifications from application server 120 and/or user device 102 associated with the gift recipient, such as a notification that the gift recipient has redeemed the gift. Likewise, in some embodiments, user device 102 associated with the gift recipient may receive notifications from application server 120 and/or user device 102 associated with the gifter, such as, for example, messages sent from the gifter or clues to assist in unlocking an electronic locking mechanism associated with a gift.

Figure 5B:
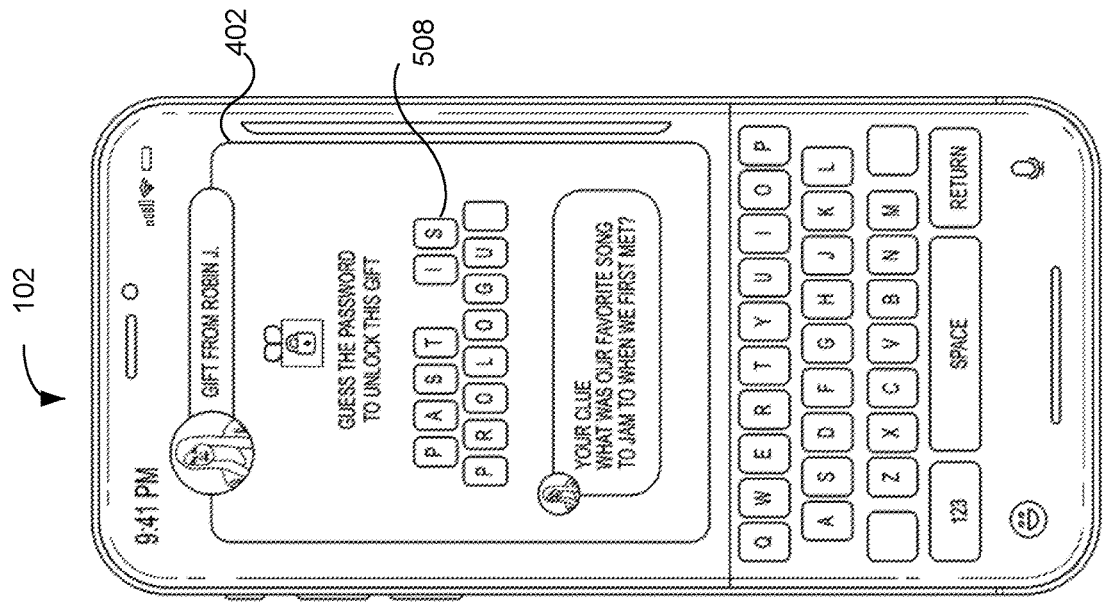
FIGS. 5A-B are exemplary embodiments of user interfaces of an electronic locking mechanism of a software application for providing gifts.
Figure 5A:
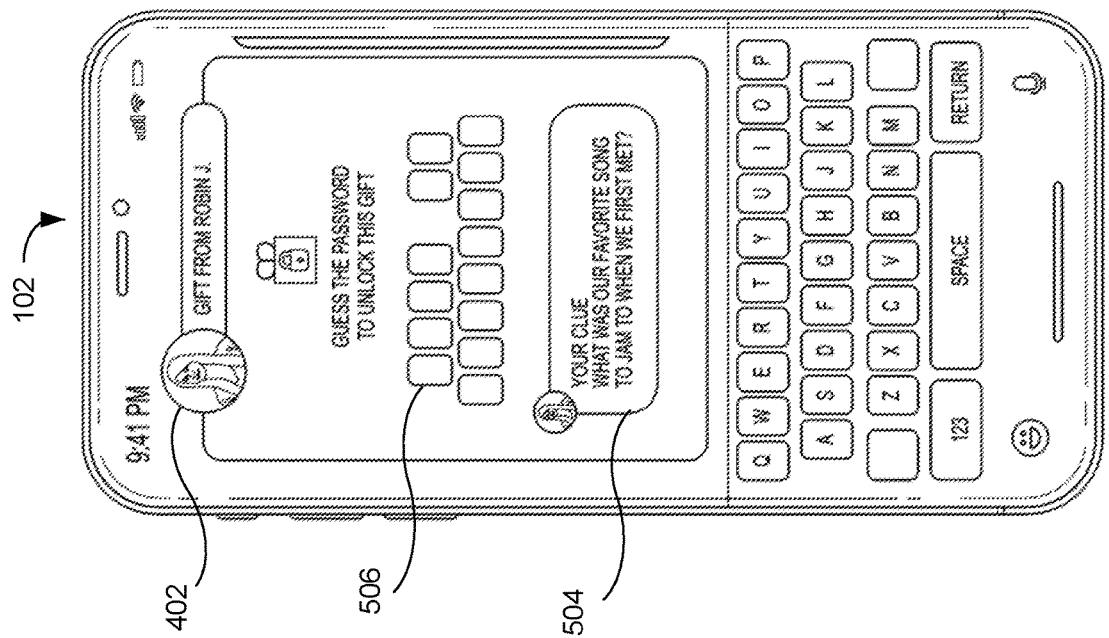

FIGS. 5A-B show example embodiments of electronic lock user interfaces of a gift mobile application 402 being run on user device 102. In particular, FIG. 5A shows an example embodiment of a user interface of gift mobile application 402 that is configured to present a gift recipient with an electronic lock and FIG. 5B shows an example embodiment of a user interface of gift mobile application 402 that shows user inputs to the electronic lock user interface that represent an attempt to unlock a gift being restricted for use by the electronic lock of gift mobile application 402.

As shown in FIG. 5A, an electronic lock may include an electronic lock prompt 504 and an electronic lock interface 506. According to some embodiments, electronic lock prompt 504 may represent a clue or instruction providing guidance to a gift recipient on how to solve the electronic lock. According to some embodiments, the electronic lock prompt 504 may be specified by the gifter at the time of creation of the gift by selecting a predetermined lock prompt 504 or by providing a customized lock prompt 504. In some embodiments, a lock prompt 504 may be associated with a lock solution that represents the input that must be entered into electronic lock interface 506 to unlock a gift, message, or other file that is being protected by the electronic lock. According to some embodiments, electronic lock interface 506 may comprise one or more fields that may receive user inputs, such as for example, a number of input boxes and spaces as shown in FIG. 5A. In some embodiments, the number of input boxes and spaces may be arranged and presented by electronic lock interface 506 to correspond to the number of characters and spacing associated with the lock solution. As shown in FIG. 5B, a gift recipient may input a lock input 508 to attempt to unlock the electronic lock. In the example shown in FIG. 5B, lock input 508 represents a song title corresponding to electronic lock prompt 504. According to some embodiments, gift mobile application 402 may locally store the lock solution associated with an electronic lock on user device 102. In such cases, gift mobile application 402 may unlock an associated file, such as an electronic gift, a media file, an image, a message, or any other such type of file, upon detecting that the gift solution has been correctly entered into electronic lock interface 506. According to some embodiments, upon detecting that an incorrect gift solution has been entered into electronic lock interface 506, gift mobile application 402 may cause user device 102 associated with the gift recipient to send an incorrect solution message to user device 102 associated with the gifter. The incorrect solution message may provide a notification that the gift recipient has entered an incorrect solution to the electronic lock and may provide the incorrect solution for the gifter's viewing and entertainment. According to some embodiments, the gift mobile application 402 may provide a messaging functionality that may allow the gifter to send additional clues to the gift recipient for viewing on user device 102. In some embodiments, gift mobile application 402 may provide a remote unlock functionality that allows the gifter to remotely unlock a gift sent to the gift recipient, so that the gifter may authorize the gift recipient to access and use the gift despite failed attempts at unlocking the gift. In some embodiments, gift mobile application 402 may be configured to enable a gifter to specify a maximum number of unlock attempts, such that in response to gift mobile application 402 determining that the gift recipient has incorrectly attempted to unlock the electronic lock beyond the maximum number of unlock attempts, then gift mobile application 402 may cancel the gift sent to the gift recipient and provide notifications to one or more of the gifter and the gift recipient that the gift has been cancelled due to the gift recipients failure to unlock the gift within the number of attempts specified by the gifter. According to some embodiments, an electronic lock may comprise an image that a user must trace or color in by swiping on a touchscreen associated with user device 102. For example, in some embodiments, the electronic lock may be configured to unlock if the gift recipient traces around a target image within an accuracy that falls within a predetermined confidence range.

While web server 110, location services server 112, transaction server 114, gift application server 120, merchant database terminal 126, merchant POS terminal 127, third party financial server 128 and user device 102 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 110, location services server 112, transaction server 114, gift application server 120, a merchant database terminal 126, merchant POS terminal 127, third party financial server or user device 102 may include a greater or lesser number of components than those illustrated.

Figure 6:
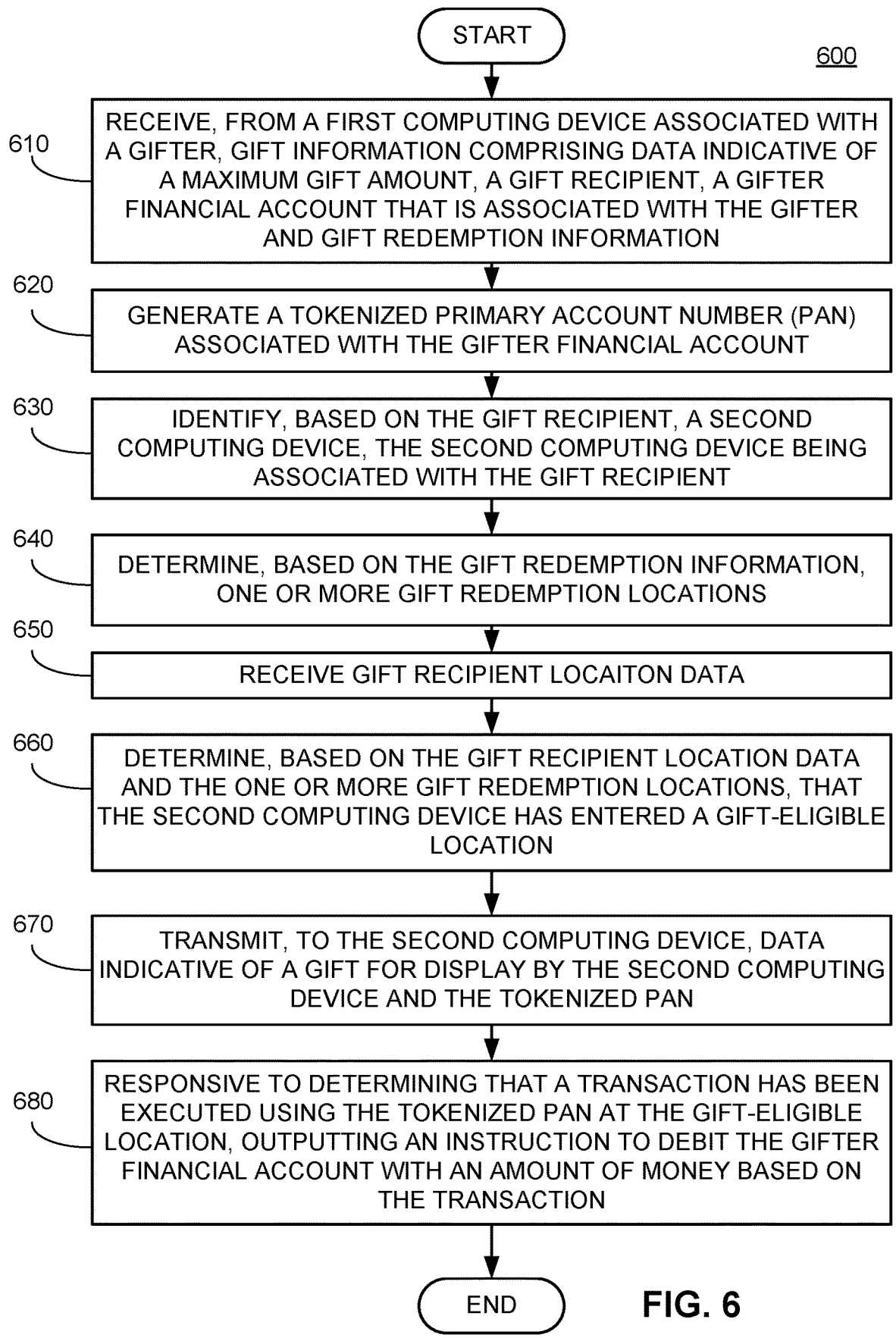
FIG. 6 is a flowchart of an exemplary method for providing a customized location-activated gift.

FIG. 6 shows a flowchart of a method 600 for providing a customized location-activated gift, such as an electronically conveyed financial gift. Method 600 may be performed by a system including some or all of web server 110, location services server 112, transaction server 114, database 118, gift application server 120, merchant database terminal 126, merchant POS terminal 127, third party financial server 128 and one or more user devices 102.

In block 610, the system (e.g., via gift application server 120) may receive, from a first computing device associated with a gifter, gift information comprising data indicative of a maximum gift amount, a gift recipient, and a gifter financial account that is associated with the gifter and gift redemption information. According to some embodiments, the gift redemption information may include an identification of one or more merchants or types of merchants at which the gift may only be redeemed.

In block 620, the system (e.g., via gift application server 120) may generate a tokenized primary account number (PAN) associated with the gifter financial account.

In block 630, the system (e.g., gift application server 120) may identify, based on the gift recipient, a second computing device, the second computing device being associated with the gift recipient. For example, in some embodiments, a gift recipient may have preregistered the second computing device (e.g., user device 102) with a software application, such as gift mobile application 402, by virtue of installing the software application on the second computing device and/or creating and filling out a user account associated with the software application. Thus, in some embodiments, gift application server 120 may be configured to identify user device 102 associated with the gift recipient based on an identification number associated with the device, such as a phone number, a MAC address, an IP address, or the like.

In block 640, the system (e.g., gift application server 120) may determine, based on the gift redemption information, one or more gift redemption locations. According to some embodiments, determining one or more gift redemption locations may include looking up one or more merchant locations associated with the one or more merchants. In some embodiments, each gift redemption location of the one or more gift redemption locations may correspond to a geofenced area.

In block 650, the system (e.g., location services server 112) may receive gift recipient location data. According to some embodiments, gift recipient location data may include global positioning satellite (GPS) data received from the second computing device. In some embodiments, gift recipient location data may include wireless access point connection information associated with the second computing device. According to some embodiments, the wireless access point connection information may include locations of one or more wireless access points. In some embodiments, gift recipient location data may include visual information obtained from an image capture device associated with the second computing device.

In block 660, the system (e.g., location services server 112) may determine, based on the gift recipient location data and the one or more gift redemption locations, that the second computing device has entered a gift-eligible location. According to some embodiments, determining that the second computing device has entered a gift-eligible location may comprise determining that the location of the second computing device is within a geofenced area associated with a gift redemption location. In some embodiments, determining that the second computing device has entered a gift-eligible location may include determining the approximate position of the second computing device based on the locations of the one or more wireless access points and determining that the approximate position of the second computing device corresponds to the gift-eligible location. In some embodiments, determining that the second computing device has entered a gift-eligible location may include identifying a visual marker by performing image recognition techniques on the visual information and determining that the visual marker is associated with the gift-eligible location.

In block 670, the system (e.g., gift application server 120) may transmit, to the second computing device, data indicative of a gift for display by the second computing device and the tokenized PAN. In some embodiments, transmitting the tokenized PAN may include transmitting data configured to be stored in a digital wallet of the second computing device. In some embodiments, transmitting the tokenized PAN may include transmitting an image for display by the second computing device.

In block 680, the system (e.g. gift application server 120) may, output an instruction to debit the gifter financial account with an amount of money based on the transaction. According to some embodiments, the system may output the instruction in response to determining that a transaction has been executed using the tokenized PAN at the gift-eligible location.

Figure 7:
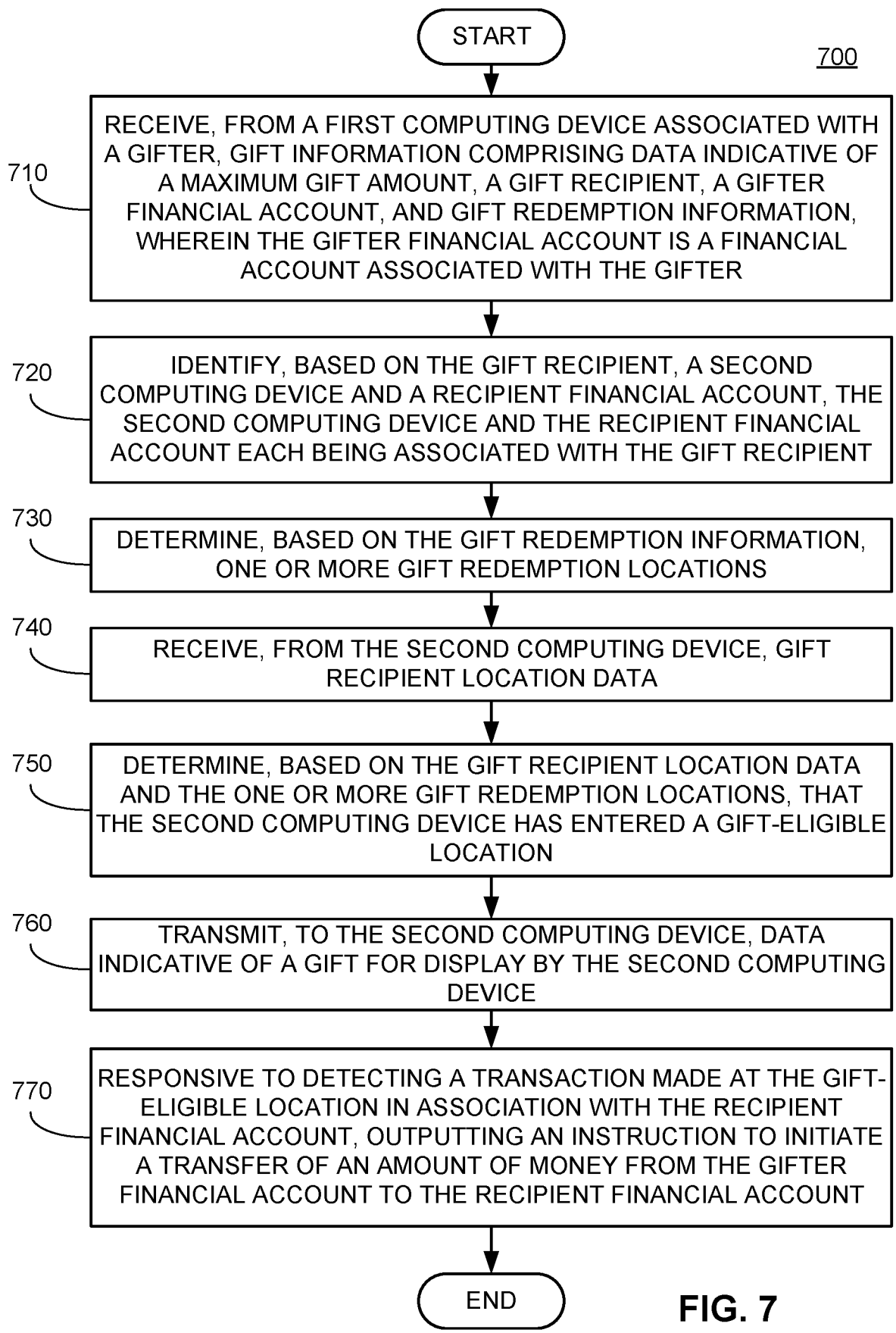
FIG. 7 is a flowchart of another exemplary method for providing a customized location-activated gift.

FIG. 7 shows a flowchart of a method 700 for providing a customized location-activated gift, such as an electronically conveyed financial gift. Method 700 may be performed by a system including some or all of web server 110, location services server 112, transaction server 114, database 118, gift application server 120, a merchant database terminal 126, merchant POS terminal 127, third party financial server 128 and one or more user devices 102.

In block 710, the system (e.g., via, gift application server 120) may receive, from a first computing device associated with a gifter, gift information comprising data indicative of a maximum gift amount, a gift recipient, a gifter financial account, and gift redemption information, wherein the gifter financial account is a financial account associated with the gifter. In some embodiments, the gift redemption information may include an identification of one or more merchants.

In block 720, the system (e.g., via gift application server 120) may identify, based on the gift recipient, a second computing device and a recipient financial account, the second computing device and the recipient financial account each being associated with the gift recipient. According to some embodiments, a recipient financial account may be a credit card account, a checking account, a savings account, or the like.

In block 730, the system (e.g., gift application server 120) may determine, based on the gift redemption information, one or more gift redemption locations. According to some embodiments, determining the one or more gift redemption locations may include looking up one or more merchant locations associated with the one or more merchants. In some embodiments, each gift redemption location of the one or more gift redemption locations may correspond to a geofenced area.

In block 740, the system (e.g., location services server 112) may receive, from the second computing device, gift recipient location data.

In block 750, the system (e.g. location services server 112) may determine, based on the gift recipient location data and the one or more gift redemption locations, that the second computing device has entered a gift-eligible location. According to some embodiments, determining that the second computing device has entered a gift-eligible location may include determining that the location of the second computing device is within a geofenced area associated with a gift redemption location.

In block 760, the system (e.g. gift application server 120) may transmit, to the second computing device, data indicative of a gift for display by the second computing device.

In block 770, the system (e.g. transaction server 114) may output an instruction to initiate a transfer of an amount of money from the gifter financial account to the recipient financial account. According to some embodiments, the system may output the instruction in response to detecting a transaction made at the gift-eligible location in association with the recipient financial account. In some embodiments, detecting a transaction made at the gift-eligible location in association with the recipient financial account may include monitoring transaction data comprising a plurality of transaction authorization requests originating from one or more merchant POS devices, wherein each transaction authorization request comprises: an attempted purchase financial account representing a financial account used to make an attempted purchase, an attempted transaction amount, and a merchant code; and identifying a gift-eligible transaction authorization request of the plurality of transaction authorization requests by determining that the recipient financial account matches the attempted purchase financial account of a first transaction authorization request and determining, based on the merchant code associated with the first transaction authorization request, that a location of a merchant POS device associated with the first transaction authorization request corresponds to the gift-eligible location.

Figure 8:
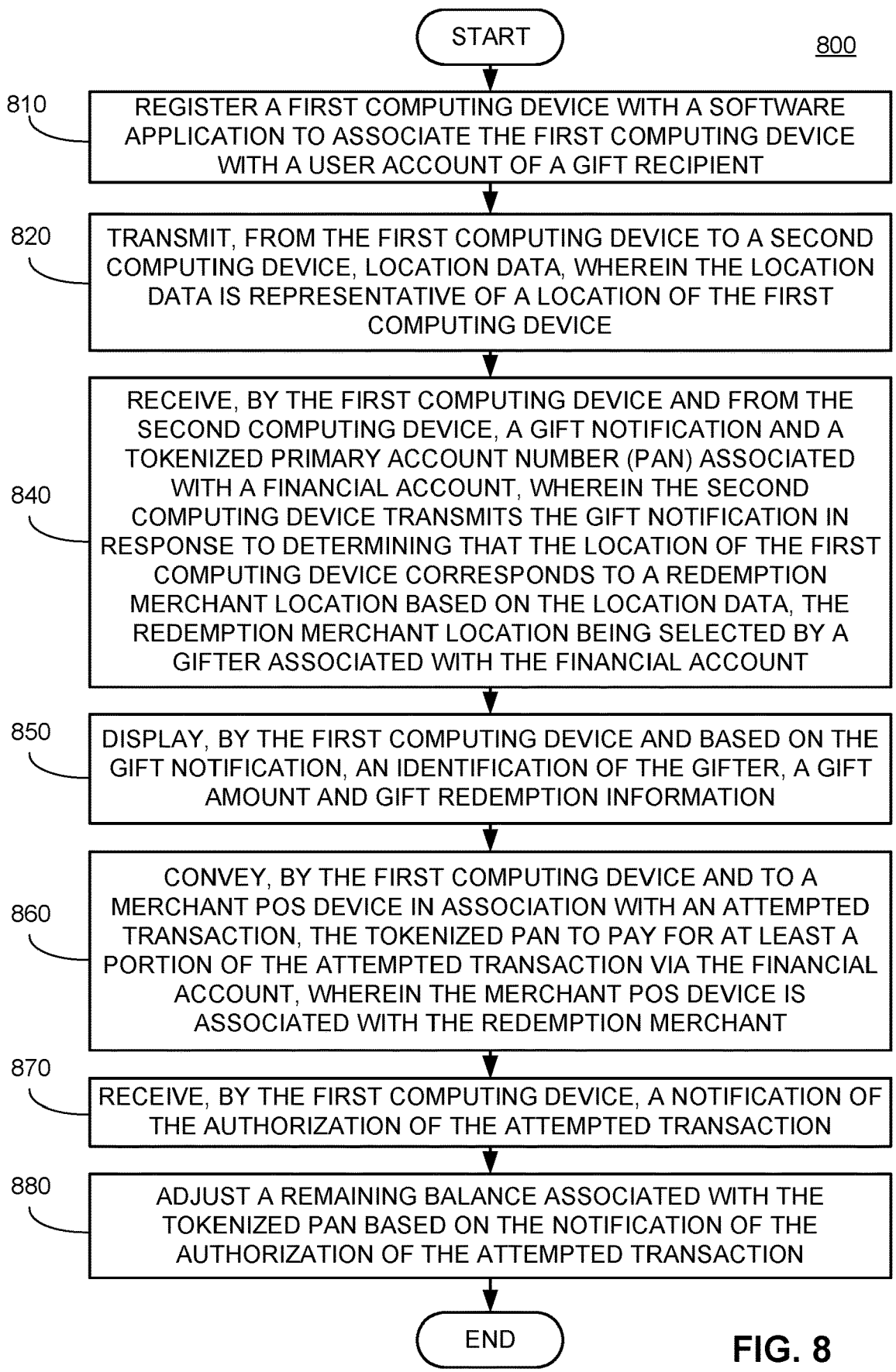
FIG. 8 is a flowchart of another exemplary method for providing a customized location-activated gift.

FIG. 8 shows a flowchart of a method 800 for providing a customized location-activated gift, such as an electronically conveyed financial gift. Method 800 may be performed by a system including some or all of web server 110, location services server 112, transaction server 114, database 118, gift application server 120, a merchant database terminal 126, merchant POS terminal 127, third party financial server 128 and one or more user devices 102.

In block 810, the system (e.g., via user device 102) may register a first computing device with a software application to associate the first computing device with a user account of a gift recipient.

In block 820, the system (e.g., via user device 102) may transmit, from the first computing device to a second computing device, location data, wherein the location data is representative of a location of the first computing device.

In block 830, the system (e.g., via user device 102) may receive, by the first computing device and from the second computing device, a gift notification and a tokenized primary account number (PAN) associated with a financial account, wherein the second computing device transmits the gift notification in response to determining that the location of the first computing device corresponds to a redemption merchant location based on the location data. In some embodiments, the redemption merchant location may be selected by a gifter associated with the financial account. In some embodiments, the tokenized PAN may be stored in a digital wallet.

In block 840, the system (e.g., via user device 102) may display, by the first computing device and based on the gift notification, an identification of the gifter, a gift amount and gift redemption information.

In block 850, the system (e.g., via user device 102) may convey, by the first computing device and to a merchant POS device in association with an attempted transaction, the tokenized PAN to pay for at least a portion of the attempted transaction via the financial account. According to some embodiments, the merchant POS device may be associated with the redemption merchant. In some embodiments, the tokenized PAN may be conveyed to the merchant POS device using near field communication.

In block 860, the system (e.g. via user device 102) may receive, by the first computing device, a notification of the authorization of the attempted transaction.

In block 870, the system (e.g. via user device 102) may adjust a remaining balance associated with the tokenized PAN based on the notification of the authorization of the attempted transaction. For example, in some embodiments, user device 102 of gift recipient may maintain and display a current balance of the gift so that the gift recipient may know how much of the gift remains to be redeemed.

According to some embodiments, the system may receive, by the first computing device and from the second computing device, the redemption merchant location. In some embodiments, the system may store geofencing information corresponding to an area associated with the redemption merchant location. According to some embodiments, transmitting location data associated with the first computing device may occur in response to determining, by the first computing device, that first computing device has entered the area associated with the redemption merchant location. In some embodiments, the system may receive virtual lock data representative of puzzle, riddle, or password selected by the gifter. The system may display, by the second computing a virtual lock, wherein the virtual lock is configured to prevent use of the tokenized PAN until a predetermined user input is received. In some embodiments, the system may receiving, by the second computing device, the predetermined user input, wherein the predetermined user input unlocks the virtual lock to enable use of the tokenized PAN.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use case describes an examples of a typical user flow pattern. They are intended solely for explanatory purposes and not in limitation. A first person (the "gifter") may want to provide a gift to a friend (the "gift recipient") to spend at a particular merchant, such as a particular restaurant, but may want to surprise the recipient with the gift the next time the recipient goes to the restaurant. To create the gift, the gifter may open a mobile application (e.g., gift mobile application 402) on their smartphone (e.g., via user device 102) and may use the mobile application to select the friend as the gift recipient. The gifter may specify which financial account they want to use to fund the gift ("gift account") by selecting, for example, a particular credit card or checking account that is associated with their user account in the mobile application. The gifter may input an amount of the gift and a selection of the restaurant that is the subject of the gift and may enter other restrictions if desired, such as an expiration date or a date before which the gift may not be used or activated. After customizing the gift, the system (e.g., via gift application server 120) may determine a gift redemption location that is associated with the specified restaurant as designated by, for example, a geofence that defines an area around the restaurant. The system may then receive location data from a smartphone associated with the designated gift recipient to track the gift recipient's location. Upon determining (e.g., via location services server 112) that the gift recipient has entered the specified area around the restaurant, the system (e.g., via web server 110) may transmit a message to the gift recipient to notify them that they have received a gift from the gifter, and may also activate the gift for use. The gift may be sent to the gift recipient as a tokenized PAN for use in electronic payment at the restaurant or the gift may be in the form of a reimbursement to an account of the gift recipient following a purchase at the restaurant using an account that is associated with the gift recipient. In either case, the system (e.g., via transaction server 114) may receive and monitor transaction authorization request data generated by the restaurant (e.g., via merchant POS terminal 127) at the time of the purchase made by the gift recipient to identify the gift transaction and either authorize the expenditure using the tokenized PAN or initiate a reimbursement to the gift recipient's account. The system may utilize a merchant code in the transaction authorization request to positively identify that the purchase is being made at the designated restaurant before authorizing payment/reimbursement. The system may further verify that any other conditions placed on the gift by the gifter, such as date restrictions for example, may be satisfied by applying to the limitations to the data included in the transaction authorization request. In this way, the system may allow a gifter to provide a customized, location-activated gift to a friend that does not require the selected merchant(s) to be preregistered with the system so the gifter may have flexibility to provide a gift to nearly any establishment or group of establishments they desire. Further, the system allows the gifter to provide the gift as a surprise to the gift recipient in a situation where the gift recipient may immediately take advantage of the gift by being at the location where the gift may be redeemed at the exact time of receiving the gift and may allow the gifter to create the gift without paying anything until the gift is actually redeemed in association with a purchase made by the gift recipient.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A method for providing a customized location-activated gift, comprising:

receiving, from a first computing device associated with a gifter, gift information comprising data indicative of a maximum gift amount, a gift recipient, and a gifter financial account that is associated with the gifter and gift redemption information;

generating a tokenized primary account number (PAN) associated with the gifter financial account;

identifying, based on the gift recipient, a second computing device, the second computing device being associated with the gift recipient;

determining, based on the gift redemption information, one or more gift redemption locations;

determining, based on the one or more gift redemption locations, that the second computing device has entered a gift-eligible location;

transmitting, to the second computing device, the tokenized PAN, a gift notification, and an electronic lock configured to accept an input of one or more lock solutions from the second computing device, the electronic lock having a solution attempt threshold associated with the input;

responsive to the gift recipient failing to input a correct lock solution within the solution attempt threshold, receiving, from the first computing device, a remote unlock instruction;

responsive to receiving the remote unlock instruction and determining that a transaction has been executed using the tokenized PAN at the gift-eligible location, outputting an instruction to debit the gifter financial account with an amount of money based on the transaction.

2. The method of claim 1, wherein the gift redemption information comprises an identification of one or more merchants, determining the one or more gift redemption locations comprises looking up one or more merchant locations associated with the one or more merchants, and determining that the second computing device has entered the gift-eligible location further comprises receiving an image captured by the second computing device, performing image recognition on the image to identify a visual landmark, and determining, based on the identified visual landmark and the one or more gift redemption locations, that the second computing device has entered the gift-eligible location.

3. The method of claim 1, wherein determining that the second computing device has entered a gift-eligible location comprises determining that a location of the second computing device is within a geofenced area associated with a gift redemption location.

4. The method of claim 1, wherein gift recipient location data comprises global positioning satellite (GPS) data received from the second computing device.

5. The method of claim 1, wherein transmitting the tokenized PAN comprises transmitting data configured to be stored in a digital wallet of the second computing device.

6. The method of claim 1, wherein transmitting the tokenized PAN comprises transmitting an image for display by the second computing device.

7. The method of claim 1, wherein determining one or more gift redemption locations comprises receiving a specified geofenced area from the first computing device for each of the one or more gift redemption locations.

8. The method of claim 7, wherein determining that the second computing device has entered a gift-eligible location comprises determining that the second computing device has crossed the specified geofenced area for one of the one or more gift redemption locations.

9. The method of claim 8, wherein the specified geofenced area is a drawn geofenced area.

10. The method of claim 1, wherein the gift redemption information further comprises a gift limitation selected from an allowed number of uses, a specified merchant, a specified time-window for redemption, or combinations thereof.

11. A method for providing a customized location-activated gift, comprising:

receiving, from a first computing device associated with a gifter, gift information comprising data indicative of a maximum gift amount, a gift recipient, a gifter financial account, and gift redemption information, wherein the gifter financial account is a financial account associated with the gifter;

identifying, based on the gift recipient, a second computing device and a recipient financial account, the second computing device and the recipient financial account each being associated with the gift recipient;

determining, based on the gift redemption information, one or more gift redemption locations;

determining, based on the one or more gift redemption locations, that the second computing device has entered a gift-eligible location;

transmitting, to the second computing device, a gift notification and an electronic lock configured to accept an input of one or more lock solutions from the second computing device, the electronic lock having a solution attempt threshold associated with the input;

responsive to the gift recipient failing to input a correct lock solution within the solution attempt threshold, receiving, from the first computing device, a remote unlock instruction;

responsive to receiving the remote unlock instruction, outputting an instruction to initiate a transfer of an amount of money from the gifter financial account to the recipient financial account.

12. The method of claim 11, wherein the gift redemption information comprises an identification of one or more merchants and determining the one or more gift redemption locations comprises looking up one or more merchant locations associated with the one or more merchants, and determining that the second computing device has entered the gift-eligible location further comprises receiving an image captured by the second computing device, performing image recognition on the image to identify a visual landmark, and determining, based on the identified visual landmark and the one or more gift redemption locations, that the second computing device has entered the gift-eligible location.

13. The method of claim 11, wherein detecting a transaction made at the gift-eligible location in association with the recipient financial account comprises:

monitoring transaction data comprising a plurality of transaction authorization requests originating from one or more merchant POS devices, wherein each transaction authorization request comprises:

an attempted purchase financial account representing a financial account used to make an attempted purchase;

an attempted transaction amount; and a merchant code;

identifying a gift-eligible transaction authorization request of the plurality of transaction authorization requests by determining that:

the recipient financial account matches the attempted purchase financial account of a first transaction authorization request; and determining, based on the merchant code associated with the first transaction authorization request, that a location of a merchant POS device associated with the first transaction authorization request corresponds to the gift-eligible location.

14. The method of claim 11, wherein determining that the second computing device has entered a gift-eligible location comprises determining that the location of the second computing device is within a geofenced area associated with a gift redemption location.

15. The method of claim 11, wherein determining one or more gift redemption locations comprises receiving a predetermined geofenced area for each of the one or more gift redemption locations.

16. The method of claim 11, wherein the gift redemption information further comprises a gift limitation selected from an allowed number of uses, a specified merchant, a specified time-window for redemption, or combinations thereof.

17. A method for utilizing a customized location-activated gift, comprising:
registering a first computing device with a software application to associate the first computing device with a user account of a gift recipient;
identifying, by the first computing device, a redemption merchant location;
transmitting, from the first computing device to a second computing device, the redemption merchant location, wherein the redemption merchant location is representative of an approximate position of the first computing device;
receiving, by the first computing device and from the second computing device, a gift notification, an electronic lock configured to accept an input of one or more lock solutions from the second computing device, the electronic lock having a solution attempt threshold associated with the input, and a tokenized primary account number (PAN) associated with a financial account, wherein the second computing device transmits the gift notification in response to determining that the approximate position of the first computing device corresponds to the redemption merchant location;
responsive to the gift recipient failing to input a correct lock solution within the solution attempt threshold, receiving, from the first computing device, a remote unlock instruction;
displaying, by the first computing device and based on the gift notification, an identification of a gifter, a gift amount and gift redemption information;
responsive to receiving the remote unlock instruction, conveying, by the first computing device and to a merchant POS device in association with an attempted transaction, the tokenized PAN to pay for at least a portion of the attempted transaction via the financial account, wherein the merchant POS device is associated with the redemption merchant;
receiving, by the first computing device, a notification of an authorization of the attempted transaction; and
adjusting a remaining balance associated with the tokenized PAN based on the notification of the authorization of the attempted transaction.

18. The method of claim 17, wherein transmitting the redemption merchant location associated with the first computing device occurs in response to:
capturing an image by the first computing device;
performing image recognition on the image to identify a visual landmark;
determining, based on the identified visual landmark and the approximate position of the first computing device that the second computing device has entered a gift-eligible location.

19. The method of claim 17, wherein the tokenized PAN is stored in a digital wallet and conveyed to the merchant POS device using near field communication.

20. The method of claim 17, wherein the gift redemption information further comprises a gift limitation selected from an allowed number of uses, a specified merchant, a specified time-window for redemption, or combinations thereof.

* * * * *